Sept. 22, 1931.   C. H. JACOBS ET AL   1,824,551
CARGO CARRIER SUPPORT
Original Filed Sept. 10, 1925
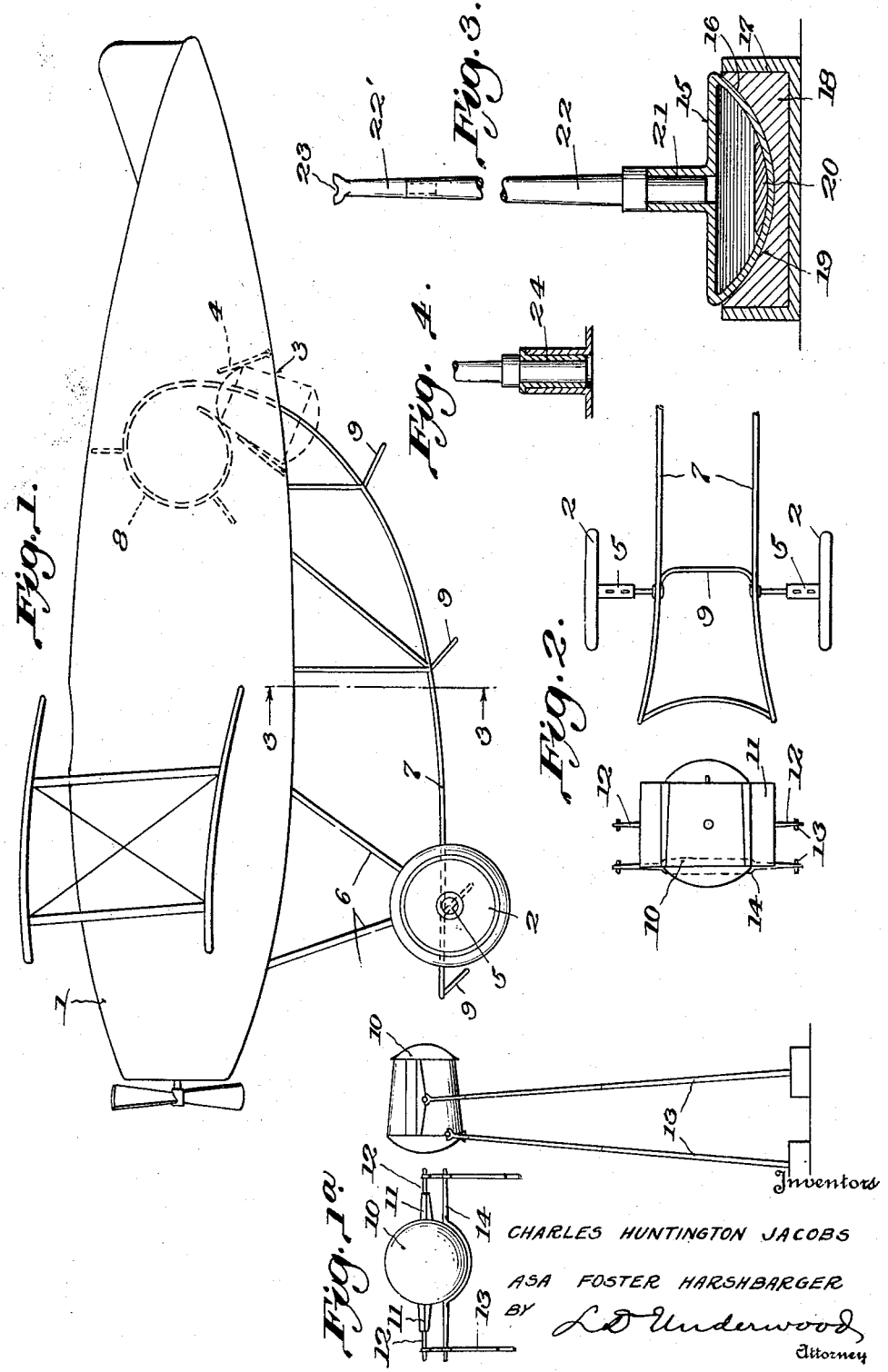
Inventors
CHARLES HUNTINGTON JACOBS
ASA FOSTER HARSHBARGER
BY L D Underwood
Attorney Patented Sept. 22, 1931

1,824,551

UNITED STATES PATENT OFFICE

CHARLES HUNTINGTON JACOBS, OF SAN FRANCISCO, AND ASA F. HARSHBARGER, OF OAKLAND, CALIFORNIA

CARGO-CARRIER SUPPORT

Original application filed September 10, 1925, Serial No. 55,504. Divided and this application filed December 26, 1929. Serial No. 416,631.

The invention relates to a support to hold a cargo carrier, adapted to receive mail or the like for transport by aircraft, in position to be picked up by the aircraft while it is in motion.

The objects of the invention are to provide a support: which will hold the cargo-carrier at a suitable distance above the ground; which is readily disengageable from the carrier when the later is brought under control of the aircraft; which will yield in any direction to motion imparted to it by engagement of the aircraft therewith or with the carrier; and which will offer no appreciable resistance to the forward motion of the aircraft, or rebound against any part of the aircraft after it has been displaced thereby.

The support is especially adapted for co-operation with a special form of cargo carrier, disclosed in our application for apparatus for loading aircraft, filed September 10, 1925, Ser. No. 55,504, of which this application is a division; but its general features may be useful in other relations.

The invention consists in the features hereinafter disclosed and claimed, and illustrated in the annexed drawings in which:

Fig. 1 is a diagrammatic side elevation of an airplane equipped with the loading device of our parent application about to engage a cargo carrier, resting upon the support forming the subject-matter of this application.

Fig. 1a is a front elevation of the top of the support with the cargo carrier resting thereon.

Fig. 2 is a top plan view of the front portion of the track of the loading device shown in Fig. 1, about to engage a cargo carrier resting on our support.

Fig. 3 is a detail view, partly in section, of one of the standards of our support, a portion of the standard being broken away.

Fig. 4 is a fragmentary view illustrating an appurtenance to be hereinafter described.

Referring to the drawings in detail, an airplane 1, having a landing gear 2, is provided with an opening 3 at the bottom of the fuselage near its rear end, closed by a trapdoor 4. Axles 5 of the landing gear are supported from the fuselage by suitable braces 6. A suitable conveyor or track is provided, which may consist of two rails 7, secured to the lower part of the fuselage and extending from a point slightly in front of the axles of the landing gear rearwardly and upwardly through the opening 3 in the fuselage. The rear ends of the rails are formed into loop or ram's horn inside the fuselage, as shown at 8. The rails are suitably braced by cross-members 9. This loading means is particularly adapted to engage a cargo carrier of special form, shown in Figs. 1, 1a, and 2, consisting of a container 10 of general egg-shape. This container has substantially diametrically opposed wing members 11, from each of which project arms 12, adapted to fold within the wings 11, the container or carrier having otherwise a substantially smooth exterior.

The construction above described forms no part of the present invention, and is here set out merely to show the construction with which the cargo-carrier support, forming the subject-matter of this application, is especially adapted to cooperate. The support will now be described.

The support consists, in the preferred embodiment illustrated, of four similarly constructed standards 13, and a saddle-plate 14. Each standard comprises an enlarged bottom member or foot 15, preferably of metal, having its lower surface spherically curved, as indicated at 16, which rests in a base member comprising an open-topped container 17, enclosing a cup 18, having its upper surface spherically curved to conform to the lower face of the foot 15 of the standard, as shown at 19. The foot 15 is provided with a weight 20, and with an upwardly projecting, centrally arranged socket 21, into which is stepped the lower end of a rod preferably formed of sections 22, 22'. These sections preferably taper upwardly, and are joined one to another by sockets and tenons, after the manner of the ordinary fishing pole except that that they are engaged rather loosely to permit the sections to be very easily disengaged. Any number of sections may be employed, or only one may be sufficient, depending upon the desired height of the support. The upper section 22' is short, and is provided at its upper end with a shallow notch 23.

Four of these standards are employed to support a cargo carrier, each of them being of the same construction except as to height, the difference in height being conveniently provided for by making two of the upper rod sections 22' shorter than the other two upper sections. These four standards are arranged at the corners of a rectangle, as shown in Fig. 2, the shorter pair of standards being placed in front, as shown in Fig. 1. The cargo carrier is supported upon the upper ends of these standards by placing the outwardly projecting arms 12 of the carrier in the notches 23 of the rear or longer pair of standards, and resting the forward portion of the carrier on the saddle-plate 14, above referred to, which is provided with ends adapted to rest in the notches 23 of the forward pair of standards and is curved to conform to the configuration of the carrier.

For proper engagement of the aircraft with the carrier it is necessary that the carrier be so supported that its major axis lies in a substantially horizontal plane. When so placed the arms are in a plane above the ends of the saddle-plate 14, which engages the lower surface of the carrier, for which reason the rear pair of standards is made longer than the front pair, as shown in Fig. 1.

When the standards are in supporting position they slightly converge upwardly, as illustrated in Fig. 1, and the weight of the carrier serves to hold them in this position.

A set of standards includes a number of rod sections 22 sufficient to hold the carrier at the desired maximum distance above the ground. In some situations it may be desirable to support the carrier closer to the ground than this maximum distance, in which case a less number of the sections would be employed. This involves the omission of one or more of the sections 22, and the use of the remainder with the upper sections 22' which contain the notches 23. The tenons of the sections are of varying size due to their tapered form, hence we provide one or more short collars 24, as shown in Fig. 4, adapted to fit into a socket to reduce its size to that of the tenon to be fitted thereinto.

*Operation.*—With the cargo carrier mounted on the support, as illustrated in Fig. 1, the pilot manoeuvres the aircraft toward the small end of the carrier with the forward ends of the rails 7 as nearly in line with the longitudinal axis of the carrier as his skill will permit. The rails come into engagement with a part of the carrier, either the body, the wings 11, or the arms 12. Forward motion is thus imparted to the carrier, and, as the rear standards are inclined forwardly and the front standards are inclined rearwardly, such forward motion causes the notches 23 of the rear standards to be slightly lowered, thus releasing the arms 12 from the shallow notches 23. The notches in the front standards first rise, thus giving time for the carrier completely to engage the track rails 7, after which they lower to release the saddle-plate 14 from the notches 23. The saddle-plate will fall by gravity action or will be pushed away by the aircraft. Should the described action not take place, the upper rod sections 22', will be disengaged from the lower rod sections on account of the loose connections between these sections, as above described. The forward motion given to the tops of the standards by engagement of the aircraft with the carrier forces the feet of the standards to turn in the cups 18, and the impetus given to the standards carries them to a position below the path of motion of any part of the aircraft; but, even if this action should not occur, there would be no damage to the aircraft, on account of the light construction of the standards and the loose joints between the sections. By reason of the frictional connection between the feet 15 of the standards and the cups 18, the standards will not rebound against the aircraft but will remain in the inclined position imposed upon them.

While we have described and illustrated but one specific embodiment of our invention, the invention may be embodied in various forms. It is therefore to be understood that the invention is not confined to the specific structure described but includes all changes, modifications, substitutions, and rearrangements which may be made within the principles above set forth.

What we claim is:

1. A support for a cargo carrier comprising a plurality of upright standards having rounded bases weighted at the bottoms and with means at the tops whereon may rest a cargo carrier at a plurality of points.

2. A support for a cargo carrier comprising a plurality of upright standards made up of freely separable sections each having a rounded base weighted at the bottom, and means at the tops of the standards whereon may rest a cargo carrier.

3. A support for a cargo carrier comprising a plurality of standards freely movable in any direction, the tops of said standards being provided with means for supporting a cargo carrier which may be detached therefrom by movement of the cargo carrier substantially in a horizontal plane.

4. Means for holding a cargo carrier so as to be picked up by aircraft while in motion comprising an upstanding support, a base for said support having frictional engagement therewith and permitting the support to move in any direction, and means at the upper end of the upstanding support to engage and hold a cargo carrier.

5. The combination specified in claim 4 in which the lower end of the support consists of a weighted, spherically curved surface, and the base has a correspondingly curved surface.

6. In a support for a cargo carrier, a base, a standard on said base frictionally engaged therewith and having universal movement in relation thereto, and means at the top adapted for engagement with a part of a cargo carrier.

7. The combination specified in claim 6 in which the standard is formed of freely detachable parts.

8. In a support for a cargo carrier, a base having a spherically curved recess therein, a standard having a weighted lower end curved to fit said recess, and means at the top adapted for engagement with a part of a cargo carrier.

9. A portable support for a cargo carrier comprising a holder having provisions at the upper end for supporting a cargo at a plurality of points, means for connecting said holder to a permanent support, such as the ground, and means forming a yielding connection between the portable and permanent supports.

10. A portable support for a cargo carrier comprising an upstanding holder having provisions at the upper end for supporting a cargo at a plurality of points, means for connecting said holder to a permanent support, such as the ground, and means forming a yielding connection between the portable and permanent supports.

11. A portable support for a cargo carrier comprising supporting means formed from a plurality of freely separable parts and having provisions at the upper end for supporting a cargo at a plurality of points, means for connecting said holder to a permanent support, such as the ground, and means forming a yielding connection between the portable and permanent supports.

12. Means for holding a cargo carrier to be picked up by aircraft while in motion comprising four standards, each having a shallow notch in its upper end, and means for yieldingly connecting the standards to a permanent support.

13. The combination specified in claim 12 in which each standard is made of freely detachable parts.

14. The combination specified in claim 12 with the addition of a supporting plate upon which the carrier is adapted to rest, said plate being provided with ends adapted to rest in the shallow notches of adjacent standards.

Signed by us this 21st day of October, 1929.

C. HUNTINGTON JACOBS.
ASA F. HARSHBARGER.